May 25, 1965   O. WALKER   3,185,126
TIRE VALVE ASSEMBLY AND AIR LEAK INDICATOR FOR PNEUMATIC
TIRES WHICH UTILIZE INNER TUBES
Filed Sept. 23, 1963   5 Sheets-Sheet 1
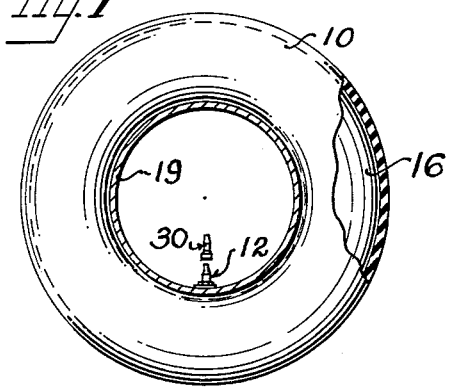
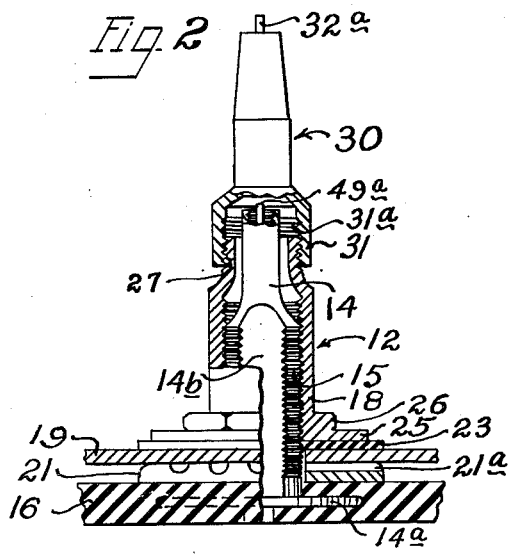
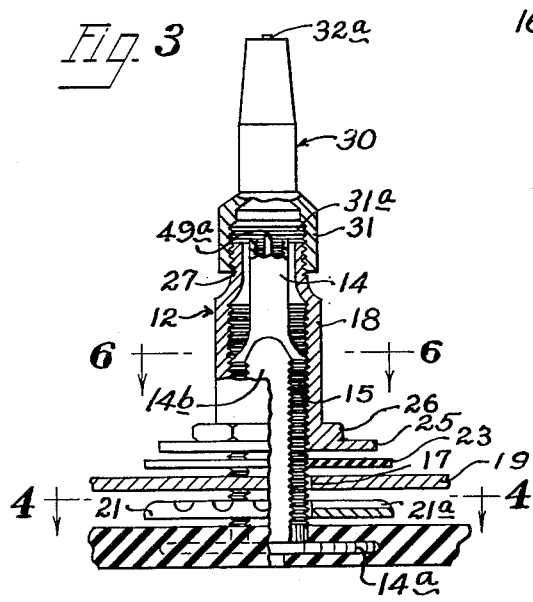
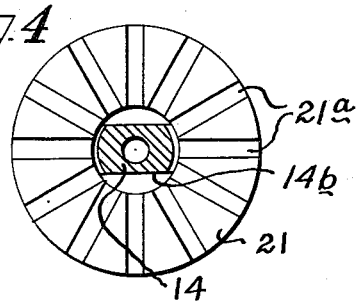
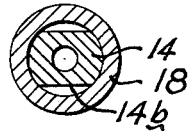
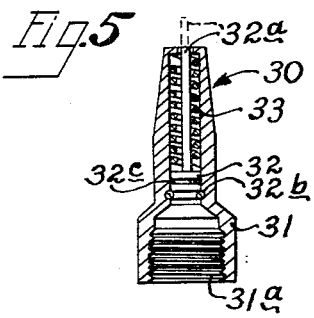
ODIS WALKER
INVENTOR.
BY
Wayland D. Keith
HIS AGENT

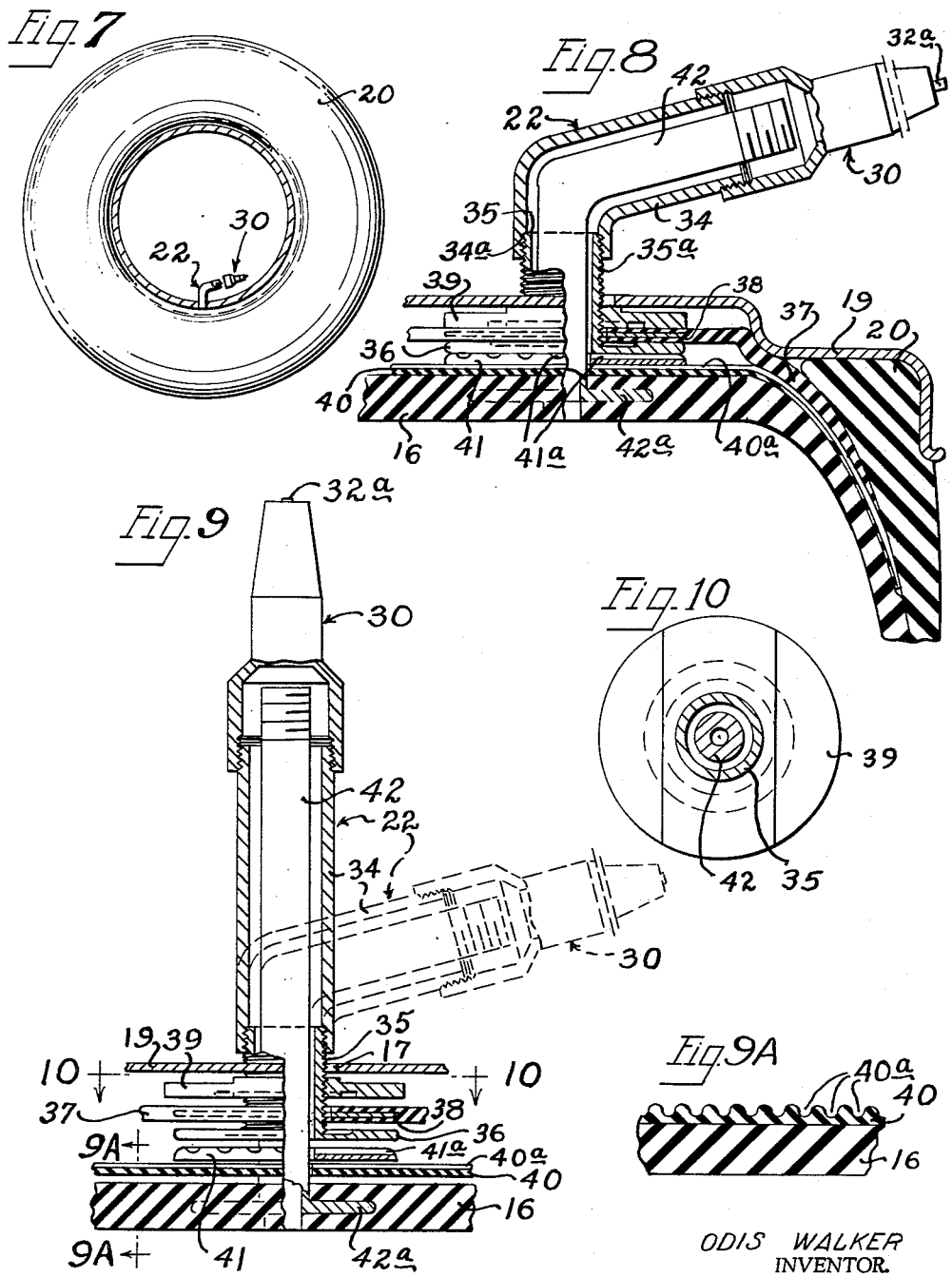

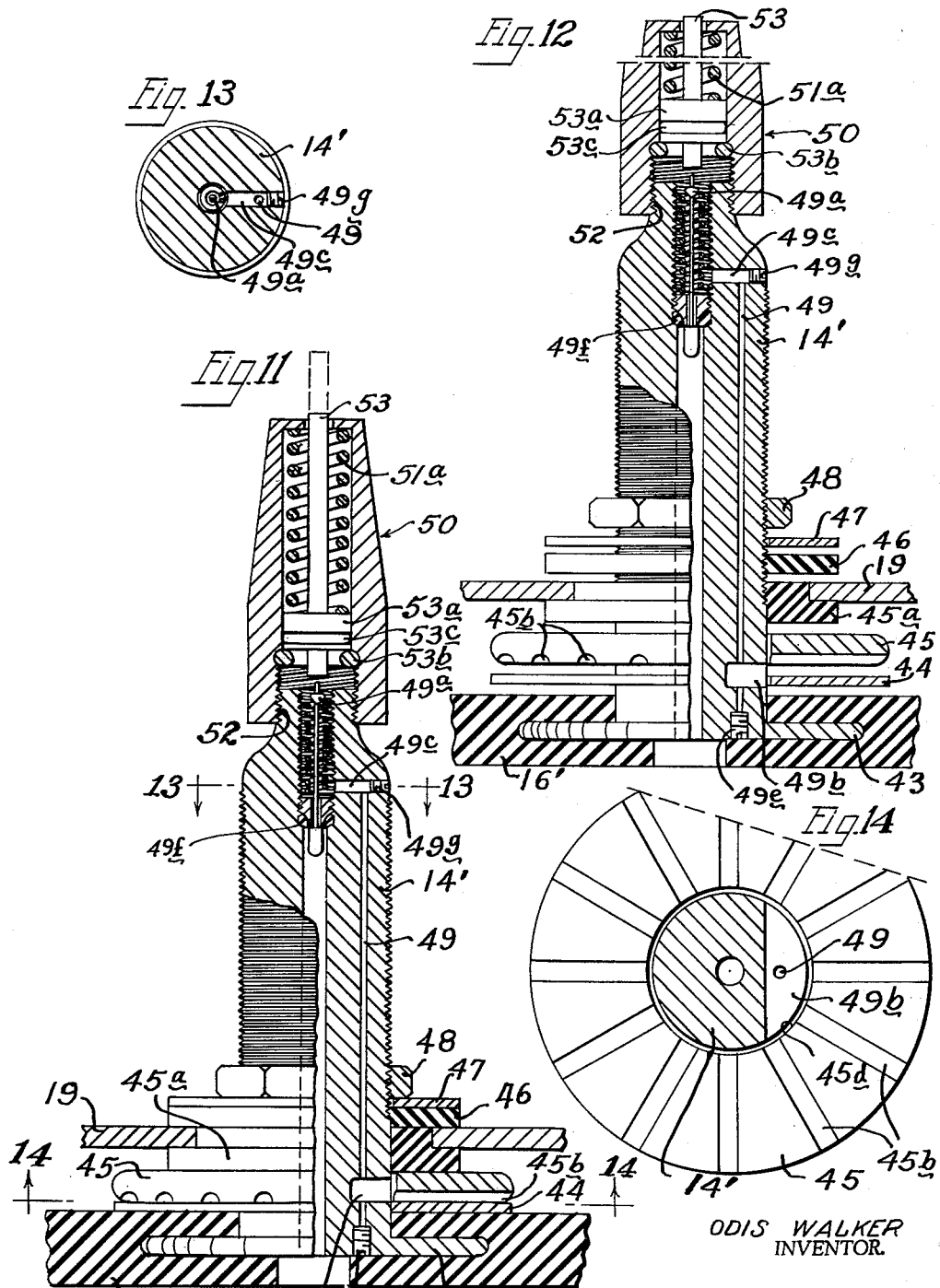

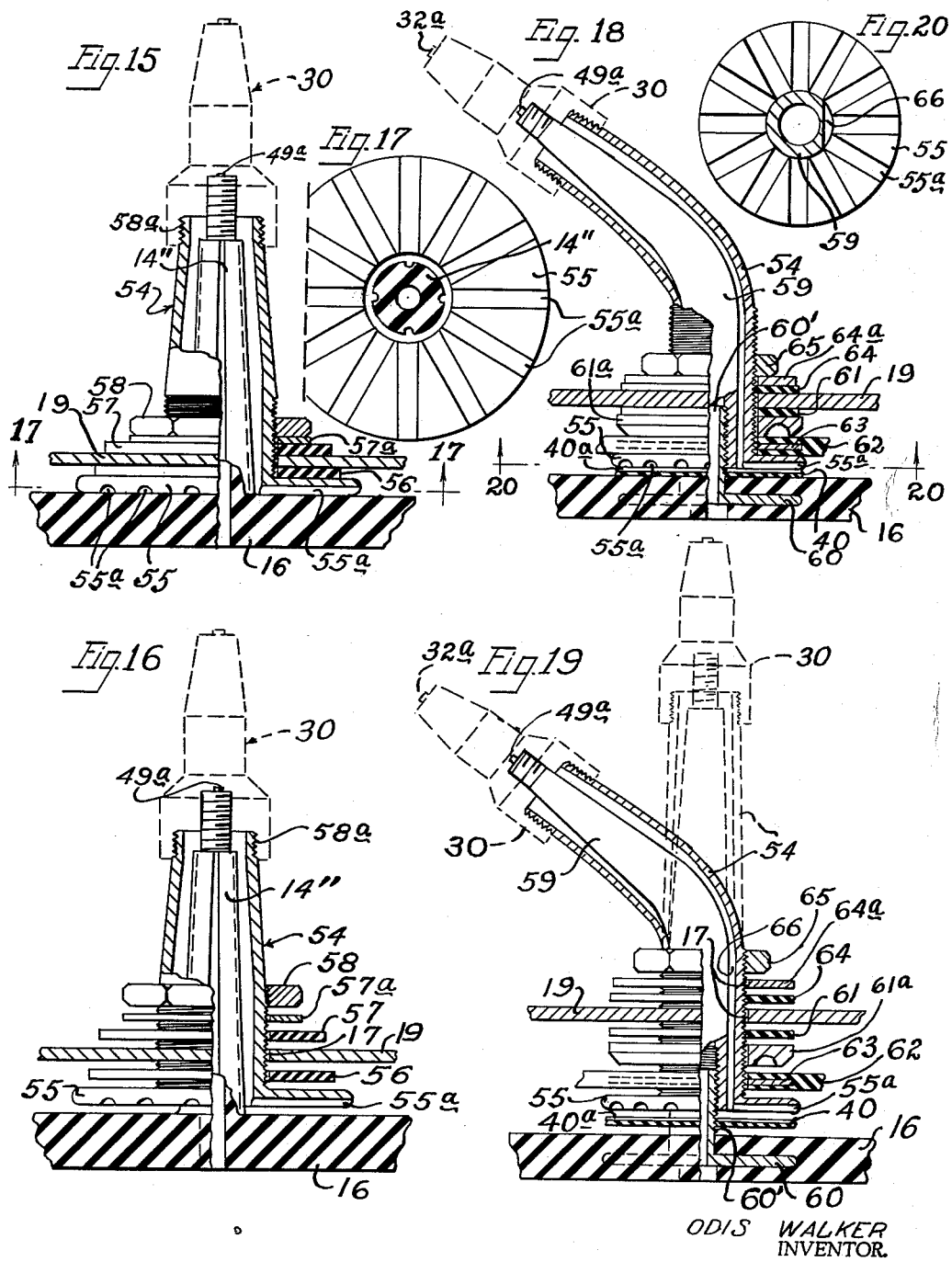

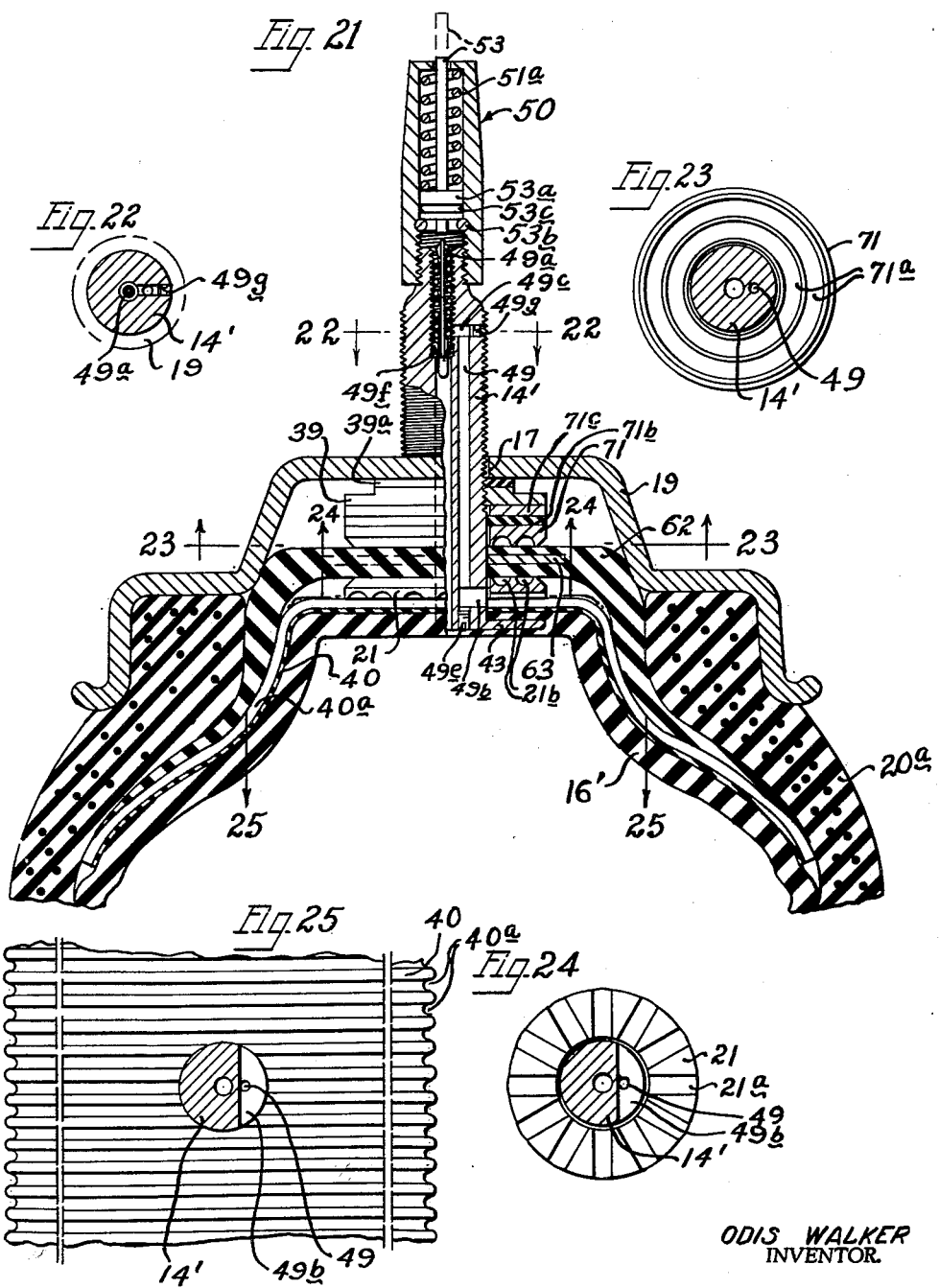

United States Patent Office 3,185,126
Patented May 25, 1965

3,185,126
TIRE VALVE ASSEMBLY AND AIR LEAK INDICATOR FOR PNEUMATIC TIRES WHICH UTILIZE INNER TUBES
Odis Walker, 5114 Cameron Road, Austin, Tex.
Filed Sept. 23, 1963, Ser. No. 310,719
14 Claims. (Cl. 116—34)

The present invention relates to pneumatic tires and tubes, and particularly to a tire valve assembly and air leak indicator. A cause for considerable annoyance for many motorists and others concerned with inflated tires using tubes, is the slow leak of air from the inner tube into the cavity formed by the periphery of the wheel or rim and the cavity within the tire seated thereon. As the inner tube leaks air, the air escapes into the cavity of the tire outward from the rim and finds its way to the hole through which the valve stem is normally positioned, which hole permits the escape of air between the valve stem and the wall of the hole in the rim.

An object of this invention is to provide a tire valve assembly which includes visible indicator means to indicate that air is being lost from the inner tube into the tire cavity, in which the inner tube is positioned, out through the valve stem opening which is formed between the rim and the valve stem which is positioned in the inner tube.

Another object of the invention is to provide a tire valve assembly whereby means is provided which prevents the escape of air from the tire cavity exterior of the inner tube and out through the hole in the rim between the rim and the valve stem, when an air leak in the inner tube occurs.

A further object of the invention is to provide a tire valve assembly and air leak indicator which is of reasonable cost to manufacture, which is simple in construction and which is easily attached to the wheel or rim having a tire thereon and a tube therein, and which device is highly effective in action.

Another object of the invention is to provide an auxiliary conduit which may be fixedly installed in a valve stem hole, to enable a leak indicator to be used thereon, so any inner tube may be used therewith, without having to attach the device to or to remove it from the valve stem each time a tube is to be put into or removed from the tire cavity on the rim.

A further object of the invention is to provide a valve stem with an auxiliary conduit to enable the leak indicator to be attached to a valve stem in a manner similar to the attachment of a valve cap thereto.

With these objects in mind and others which will become manifest as the description proceeds, reference is to be had to the accompanying drawings in which like reference characters designate like parts in the several views therein, in which:

FIG. 1 is an elevational view of a pneumatic tire and rim, with the rim being shown in section, with a portion of the tire being broken away and shown in section, of the first form of tire valve assembly, and showing the air leak indicator installed thereon, with parts thereof being shown in exploded relation;

FIG. 2 is an enlarged, assembled, elevational view, with parts broken away and with parts shown in section, of the first form of tire valve assembly and air leak indicator, as employed with the tire as shown in FIG. 1;

FIG. 3 is an enlarged, elevational, partly exploded view, with parts broken away and with parts shown in section of the first form of valve assembly and air leak indicator, as employed with the tire as shown in FIG. 1;

FIG. 4 is a sectional view taken on the line 4—4 of FIG. 3, looking in the direction indicated by the arrows;

FIG. 5 is an enlarged, longitudinal sectional view, with an alternate position being shown in dashed outline, of one form of the air leak indicator device;

FIG. 6 is a sectional view taken on the line 6—6 of FIG. 3, looking in the direction indicated by the arrows;

FIG. 7 is an elevational view of a pneumatic tire and rim with parts being shown in section, with a second form of the invention installed thereon, showing the use thereof on a bent tire valve stem, with parts being shown in exploded relation;

FIG. 8 is an enlarged, assembled, elevational view with parts broken away and shown in section of the second form of the tire valve assembly and air leak indicator, as employed with the tire as shown in FIG. 7;

FIG. 9 is an enlarged, elevational, partly exploded view, with parts broken away and shown in section of the second form of tire valve assembly and air leak indicator, with the dashed outline position indicating a manner of bending the valve stem and the shell surrounding the stem of the form of invention as shown in FIG. 8;

FIG. 9A is a sectional view taken on the line 9A—9A of FIG. 9, looking in the direction indicated by the arrows;

FIG. 10 is a sectional view taken on the line 10—10 of FIG. 9, looking in the direction indicated by the arrows;

FIG. 11 is an enlarged elevational view, with parts broken away and shown in section, of a third form of valve stem assembly and air leak indicator;

FIG. 12 is a view similar to FIG. 11 but showing certain parts in exploded relation, with parts being broken away and with parts shortened;

FIG. 13 is a sectional view taken on the line 13—13 of FIG. 11, looking in the direction indicated by the arrows;

FIG. 14 is a sectional view taken on the line 14—14 of FIG. 11, looking in the direction indicated by the arrows;

FIG. 15 is an enlarged, elevational view of a fourth form of the invention, with parts broken away and with parts shown in section of the tire valve assembly and air leak indicator, with the air leak indicator being shown in dashed outline;

FIG. 16 is a view similar to FIG. 15, but showing certain parts in exploded relation;

FIG. 17 is a sectional view taken on the line 17—17 of FIG. 15, looking in the direction indicated by the arrows;

FIG. 18 is an enlarged elevational view of a fifth form of the invention, with parts broken away and with parts shown in section, and showing the tire valve and shell therearound in bent relation, with the air leak indicator being shown in dashed outline thereon;

FIG. 19 is a view similar to FIG. 18, but showing the valve stem assembly in dashed outline before the valve stem assembly is bent, and showing certain parts thereof in exploded relation with respect to other parts thereof;

FIG. 20 is a sectional view taken on the line 20—20 of FIG. 18, looking in the direction indicated by the arrows;

FIG. 21 is an enlarged, elevational view of a sixth form of the invention, with parts broken away and with parts shown in section of the valve stem as attached to a tube, such as a truck tube with a rim being shown in cross section, and showing a portion of a casing, tube, and casing flap mounted therein, and showing the air leak indicator thereon with the plunger thereof being shown in dashed outline in one position, and in full outline in another position;

FIG. 22 is a sectional view taken on the line 22—22 of FIG. 21, looking in the direction indicated by the arrows;

FIG. 23 is a sectional view taken on the line 23—23 of FIG. 21, looking in the direction indicated by the arrows;

FIG. 24 is a sectional view taken on the line 24—24 of

FIG. 21, looking in the direction indicated by the arrows; and

FIG. 25 is a sectional view taken on the line 25—25 of FIG. 21, looking in the direction indicated by the arrows, with parts broken away and shortened.

With more detailed reference to the drawings, the form of the invention as shown in FIGS. 1 through 6, has a pneumatic tire 10 with a valve stem air leak indicator assembly, designated generally at 12 therein. The valve stem 14 has an enlarged base 14a on the inner end thereof and is secured to the inner tube 16 so as to be in fluid communication therewith. A portion 15 of the valve stem 14, intermediate the base 14a and the distal end, is threaded, as will best be seen in FIGS. 2 and 3.

This form of invention provides an internally screw threaded tubular shell 18 which is of a size to threadably engage the screw threaded portion 15 of the stem 14 on the inner tube 16. The valve stem 14 is flattened on opposite sides thereof, as indicated at 14b, to permit the escape of air from the tire cavity formed within the rim 19 and the exterior of the inner tube 16, with the air escaping through the passages formed between the flattened sides of the valve stem and the sides of a hole 17 in the rim 19.

A grooved washer 21 is interposed between the rim 19 and the inner tube 16, and provides radial grooves or lateral channels 21a for the escape of air from the tire cavity toward the valve stem hole 17 in rim 19.

A rubber gasket 23 is seated under the inner end of the shell 18, which gasket is interposed between metal washer 25 and the rim 19. The metal washer 25 and the nut 26 are formed as composite parts of shell 18, which shell is screw threaded to threadably engage the screw threads on the outer surface of stem 14 and seals the shell 18 in air tight relation with respect to the rim 19.

The outer reduced end portion of the shell 18 is provided with external screw threads, as shown at 27, to threadably receive a signal or indicator device. The signal or indicator device, shown at 30 in FIG. 5, has an enlarged inner end portion 31 which is provided with internal threads 31a to receive the threaded end portion 27 of the shell 18.

A piston 32 is fitted within a cylindrical body of the indicator device 30, which piston is biased by a spring 33, and has an outwardly extending axial rod 32a secured thereto, which rod is slidable in indicator 30, and which rod projects out through the outer end of indicator 30, as indicated in dashed lines in FIG. 5, when there is an excess of air pressure in the shell 18. A retaining ring 32b is fitted within a groove at the lower end of the cylindrical bore in which piston 32 is fitted, so as to retain the piston 32 against outward movement under the influence of spring 33.

With reference to the form of the invention as shown in FIGS. 7 through 10, the valve assembly and air leak indicator, as designated at 22, is for use with the indicator 30. In this form of the invention, the tubular shell is constructed in two parts, which are indicated at 34 and 35 respectively. The casing is indicated at 20 in FIGS. 7 and 8.

The outer part 34 has internal threads 34a on the inner end portion thereof, and the inner part 35 is a nipple which has external threads 35a formed on the outer end thereof, which inner part 35 has a base element 36 on the inner end thereof. A valve stem 42 is shown within tubular shell 34—35, the base 42a of which valve stem is vulcanized in tube 16'.

A rubber flap 37, which has a metal plate 38 embedded therein, is shown in dotted and section lines, FIGS. 8 and 9. The rubber flap 37 surmounts the base element 36. An adapter nut 39 is threaded onto the nipple of part 35 internally of the rim 19. A rubberized mesh or ribbed member 40, which has grooves 40a formed therein, is interposed between the inner tube 16 and a grooved washer 41, which washer is circumposed about the base of valve stem 42 of the assembly 22, within the tire cavity.

The rubberized mesh or grooved member 40 has the grooves 40a thereof running transversely of the rim 19 so the grooves 40a will conduct the air in the tire cavity, which is between the tire and the tube, outwardly between flap 37 and the tube 16 to the radially grooved washer 41. With the nut 39 binding the rubber flap 37 in air tight sealing relation with the adjacent face of the base 36 on nipple 35, the air is conducted through radial grooves 41a into a central hole in grooved washer 41, thence through nipple 35 into shell 34 to react on piston 32 which moves outwardly against tension exerted by spring 33. A sealing ring 32c, note FIG. 5, on piston 32 prevents passage of air thereby. The rubber flap 37 engages the inner sides of the casing 20 to form a seal therewith when the tube 16 is inflated.

With reference to the form of the invention as shown in FIGS. 11 through 14, the device is shown as having a metal valve stem 14' having a base 43.

The metal base 43 of the stem 14' is covered with rubber, so that the stem 14' may be cemented or vulcanized to the inner tube 16' at the time of manufacture of the tube, or when the inner tube 16' is repaired. The washer 44 is placed over the stem 14' exteriorly of the inner tube 16'. A grooved washer 45, has a hole 45d formed therein, which hole is in communication with radial grooves 45b therein. The washer 45 surmounts the washer 44 on the inner face of the rim 19 and has the grooves 45b thereof adjacent the washer 44. A rubber washer 45a surrounds valve stem 14' and is interposed between grooved washer 45 and rim 19 to form an air tight seal between rim 19 and valve stem 14'. Exteriorly of the rim 19 are rubber washer 46, a metal washer 47, and a hexagon nut 48, which nut is threaded onto the stem 14'. The stem 14' has screw threads along the outer length thereof to enable the nut 48 to draw the rubber washers 45a and 46 into binding engagement with rim 19 to seal the tire cavity in air tight relation with stem 14'.

A longitudinal passage, such as a hole 49, is provided along the major portion of the length of stem 14' within the wall thereof, which passage connects with a slot 49b near the inner end of valve stem 14', so that the slot will be in register with radial grooves 45b of washer 45 which surrounds the valve stem 14' within the tire cavity so that the air may escape from the tire cavity through the radial grooves 45b into an enlarged hole 45d within washer 45, thence through the slot 49b and hole 49 in valve stem 14' and into a cross-drilled hole 49c near the distal end of valve stem 14', which hole 49c interconnects with hole 49 and an axial threaded bore within the valve stem 14', in which valve core 49a is positioned so as to direct air from the tire cavity intermediate the inside of the tire and exterior of tube 16' into the valve core bore above the seat of the valve core 49a. The valve stem 14' is threaded, as indicated at 52, to threadably receive air leak indicator 50 thereon, which air leak indicator 50 is of substantially the same construction as air leak indicator 30, except the indicator 50 has internal threads 51 within the inner end thereof of a size to receive the reduced outer end of externally screw threaded portion 52 of valve stem 14' to enable the air leak indicator to be mounted directly on the outer end of the valve stem 14'.

The air leak indicator 50 also has a movable, axial leak indicator pin 53 therein. A compression spring 51a surrounds the axial leak indicator pin 53, which spring 51a has one end thereof seated against an inturned rim on the outer end of the body thereof, with the other end of the compression spring 51a being in bearing engagement with piston 53a, to which piston is secured the leak indicator pin 53. A piston retainer ring 53b is fitted within a groove within the body of leak indicator 50 inward of piston 53a to retain the piston within the body of leak indicator 50 against the resilient action of spring 51a. A portion of the leak indicator pin 53 extends upwardly above the outer end of the body of air leak indicator 50, therefore, when an air leak, either in the seat of the valve core 49a or in the tire cavity is evidenced, the outwardly extending portion of the leak indicator pin 53 will be urged outwardly a substantial distance to indicate the presence of air pressure in the tire cavity exterior of the inner tube or the leakage of the valve core 49a within the stem 14'. Upon leakage of air from the tire cavity or from the core 49a, the pressure reacting upon piston 53a will move the piston outwardly within the bore of leak indicator 50, which will compress spring 51a so long as pressure is maintained on the piston 53a, as a piston ring 53c prevents air passing outward by piston 53, thereby preventing the escape of air from the tire cavity or from the inner tube 16' in event the valve core 49a leaks.

In the form of the invention as shown in FIGS. 15 through 17, an adapter assembly is provided to enable the use of an inner tube 16 having a rubber valve stem, which adapter assembly enables the inner tube 16 to be inserted into or removed from a casing without having to assemble any parts onto or to disassemble any parts from the valve stem. And while a rubber valve stem has been shown, a metal valve stem is equally applicable for use in the present adapter assembly.

In this form of the invention, an adapter shell 54 is fitted within hole 17 of rim 19, which shell 54 has a base 55, which base has radial grooves on the lower face thereof. The inner ends of the grooves are in communication with the hollow portion of shell 54. A rubber washer 56 is fitted around the shell 54 to seat on a face of base 55 on the opposite side from the radial grooves 55a. The adapter shell 54 extends through the hole 17 in rim 19 and a rubber washer or gasket 57 is fitted around adapter shell 54 and is adapted to seat on the outer face of rim 19. A metal washer 57a surrounds the adapter shell 54 and seats upon the rubber washer 57. The adapter shell 54 is screw threaded for the length of the lower enlarged portion thereof to threadably engage with a nut 58, which nut will draw the face of base 55 into sealing relation with rubber washer 56, rim 19 to effect a sealing of the inside of the rim 19 and the nut 58 will bindingly engage the metal washer 57a to urge rubber washer 56 against the outer face of the rim 19 so as to effect a positive seal of the shell 54 within hole 17.

The air leak indicator 30 is adapted to threadably engage threads 58a on the outer end of adapter shell 54. In this manner the tube 16 may be inserted into a casing in such manner that the valve stem 14" may extend through the adapter shell 54 and the casing fitted within the rim 19 so as to render the tire cavity air tight. In this manner, if a tire and tube are punctured, air will find its way between the inner portion of the casing and the outer portion of the tube and will pass outward through radial grooves 55a into the hollow portion of shell 54, thence upward by valve stem 14" with the pressure of escaping air reacting on piston 32 to urge leak indicator pin 32a outward, as indicated in dashed outline in FIG. 5. In event a valve core within the valve stem leaks, this also will exert pressure on piston 32 to indicate leakage of pressure, however, by removing air leak indicator 30, the valve core may be tested to determine leakage, and if the valve core does not leak, the pressure usually indicates a leak within the inner tube.

The form of the invention as shown in FIGS. 18 through 20 is somewhat similar to the form of the invention shown in FIGS. 15 through 17, however, the present form of the invention differs from the aforementioned form, in that the valve stem is preferably made of metal and is attachably connected to the inner tube and the air is conveyed from the tire cavity, by a corrugated strip, upward between the tire flap and the tube to a hollow shell which is in communication with a leak indicator.

In this form of the invention, the valve stem is indicated by the numeral 59, which valve stem is connected to a base 60 which is made of metal and has a screw threaded nipple or spud 60' thereon. The base 60 is vulcanized to the inner tube 16 in a manner well understood in the construction of tubes so that the screw threaded spud or nipple will extend outward therefrom. The valve stem 59 has screw threads therein to threadably engage the spud or nipple 60' in air tight relation, as will best be seen in FIG. 18. The corrugated rubber strip 40, which has grooves 40a therein, surrounds spud 60' in a manner similar to that shown in FIG. 9A, and provides channels or passages intermediate the tube 16 and a rubber tire flap 62, so as to readily conduct air upward from the casing cavity so the air will find its way to the grooved passages 55a in radially grooved base 55 of a shell 54. The shell 54 is made integral with the base 55, however, the stem 59 is flattened on one side, as indicated at 66, so as to form a groove or air passage from the tire cavity upward by the valve stem 59 within shell 54.

The rubber flap 62 preferably has a metal insert or washer 63 therein through which a hole is formed to receive shell 54 therethrough. An apertured metal washer 61a surmounts rubber tire flap 62 with a rubber washer 61 surrounding the shell 54 so as to form a seal between metal washer 61a and the rim 19. A further rubber washer 64 overlies rim 19 and surrounds shell 54 and is urged into binding engagement with metal washer 64a by a screw threaded nut 65, which threadably engages the threaded portion of shell 54 so as to draw the base 55, rubber flap 62, metal washer 61a, rubber washer 61, rim 19, rubber washer 64, and metal washer 64a in binding engagement so that the rubber washers 61 and 64 will form an air tight seal around shell 54 within the hole 17 of rim 19.

With this arrangement, as best illustrated in FIG. 18, air escaping from the inner tube 16 will find its way between the inner tube and the inner wall of the casing to grooves 40a of strip 40, thence along these grooves in strip 40 to conduct the air to radial grooves 55a in base 55, which will conduct the air upward through passage 66 and into an air leak indicator, as shown in dashed outline and which is designated generally at 30, and with the air escaping from the tire cavity or from a valve core, such as valve core 49a within valve stem 59, the pressure will react on piston 32 in the leak indicator 30 to cause indicator rod 32a to move outward in the manner as set forth in the form of the invention described in FIGS. 1 through 6.

In this form of the invention, the metal stem 59 and shell 54 may be initially straight, as indicated in dashed outline in FIG. 19, and when in place, they may be bent to the desired angle. Furthermore, the shell 54 has an enlarged threaded portion on the lower end, which enables a screw threaded nut 65 to be slipped over the reduced upper portion of the shell and even though bent, to threadably engage threads on the lower portion of the shell 54. In this manner the shell may be removed from the rim, and if desired, the stem 59 may be unscrewed from the spud or nipple 60' without removing the stem from the shell, if bent. This form of the invention is particularly adaptable for some types of truck tires and rims.

The form of the invention, as shown in FIGS. 21 through 25 is particularly adaptable for use with truck tires and rims, or with other heavy tires used on heavy equipment. In this form of the invention, a valve stem 14' is vulcanized into a tube 16' which valve stem is similar to that shown in the form of the invention as illustrated in FIGS. 11 through 14, in as much as hole 49 is drilled longitudinally of stem 14' from a base portion 43. The hole 49 is plugged by a plug, such as indicated at 49e. A slot 49b is cut through a side of the stem adjacent the outer surface of tube 16' so as to intersect hole or passage 49. A further hole 49c is cross-drilled, near the distal end of valve stem 14', to intersect hole 49 and the axial hole in which valve core 49a is mounted to be outward from the valve core seat 49f. In this manner, when the valve stem is assembled onto a rim 19 which has a tire 20a thereon, an air tight cavity may be formed within the confines of casing 20a and rim 19. The tube 16' has an apertured, transversely corrugated rubber strip 40 surmounting the inner diameter of the tube 16' so that the corrugations will face upwardly, as will best be seen in FIGS. 9A and 25.

A radially grooved washer 21 with grooves 21a formed therein is slid over valve stem 49 so the radial grooves 21a will be adjacent the corrugations in corrugated strip 40. It is preferable that radially grooved washer 21, as shown in FIG. 21, have annular grooves 21b on the opposite side thereof, which annular grooves form a complementary gripping arrangement with a rubber tire flap 62 and a washer 71 on the valve stem 14' has annular grooves 71a thereof in complementary engaged relation with the upper face of flap 62. A rubber washer 71b and a metal washer 71c surrounds valve stem 14' to enable a screw threaded nut 39 to threadably engage valve stem 14' to hold tube 16', the corrugated strip 40, radially and annularly grooved washer 21, tire flap 62, annularly grooved washer 71, rubber washer 71b, metal washer 71c in binding relation upon tightening nut 39. Upon tightening the various elements mentioned into binding engagement, a rubber washer 39a surmounts nut 39 so as to fit in sealing relation with the inner surface of rim 19 to seal hole 17 therein.

The tire flap 62 extends downwardly along the inner surface of casing 20a a spaced distance to form an air tight seal therewith when tube 16' is inflated. However, it is preferable to have the corrugated strip to extend to a point below or inward of tire flap 62, thereby channeling any air which might find its way around the circumference of the tube interior of the casing 20a upward through transverse corrugations of strip 40 into a space intermediate tire flap 62 and the upper face of corrugated strip 40 and thence into radial grooves 21a which grooves are in register with slot 49b, which directs air upward through longitudinal hole 49 in stem 14' into and through hole 49c, which has a plug 49g in the outer end thereof so as to direct the air into the axial opening in the valve stem above the valve core seat 49f, and thence upward to react on the inner face of piston 53a within valve leak indicator 50, which indicator threadably engages the upper end of valve stem 14' so as to cause indicator rod 53 therein to be moved upward a spaced distance above the distal end of the body of the leak indicator 50, as shown in dashed outline in FIG. 21, so as to indicate the presence of a leak in the tire cavity or in a valve core within valve stem 14' in the manner set out hereinbefore.

As previously indicated, the piston 53a has a sealing ring 53c thereon which forms a seal with the bore in the body of leak indicator 50, and when the leak indicator 50 is screwed into place on the upper end of valve stem 14', any air pressure escaping outward through hole 49 and into the axial opening in which the valve core 49a is positioned, or by the seat of valve core 49a in stem 14', the piston will be moved upward until the movement thereof is arrested by spring 51a, thereby preventing passage of air outward through the leak indicator 50. With the hole 17 in the rim 19 being sealed and with the air being prevented from escaping out through air leak indicator 50 the leak is retarded to the extent that only the air passing out through the initial puncture will pass out from the tire cavity, thereby effectively retarding leakage of air pressure from the tire cavity.

In the form of the invention as shown in FIGS. 21 through 25, for heavy duty truck tires and the like, the flap forms an effective seal with the casing and, if desired, the flap may be coated with a sealing compound and while a rubber washer 39a has been shown to close the hole 17, very little or no air leak from the tube will reach the hole 17.

In both forms of leak indicator, as shown at 30 and 50, the respective piston rods 32a and 53 will be moved outward when the air pressure on the inner face of the respective pistons exceeds the normal elastic setting of the respective springs 33 and 51a, which will cause the respective piston rods to extend through the distal end of the respective indicators to indicate an increase in air pressure in the cavity of the tire exterior of the inner tube or to indicate the leakage of a valve core which may be checked readily, and if negative, usually indicates a leak in the inner tube.

Since the pistons in the respective air leak indicators are in close fitting relation with the cylindrical bore of the respective air leak indicators, air will not be permitted to escape thereby, and since the tire cavity is sealed against air passing outward therefrom, except through a passage leading to the respective leak indicators, the principal avenue of escape of air from the tire cavity is closed when the tube is punctured but not cut or torn, and with the air escaping from a punctured tube in the tire cavity, very little air will escape from the hole in the tire, as the edges thereof, if small, will be pressed together which prevents air from leaking thereby and with the hole 17 in the rim 19 sealed, the air is effectively retained in the tire cavity until such time as the tire can be taken to a suitable and convenient place of repair.

While the invention has been illustrated and described in some detail in the several forms thereof, it is to be understood that changes may be made in the minor details of construction and adaptations made to different installations without departing from the spirit of the invention or the scope of the appended claims.

Having thus clearly shown and described the invention, I claim:

1. An air leak indicator for use with a pneumatic tire and rim assembly, which rim is perforate, which tire has an inner tube therein, which tube has an independent, self-contained air cavity therein, which air leak indicator comprises;

(a) a valve stem mounted on the inner tube and having dual conduits formed therein,
      (1) one of which conduits is adapted to be in fluid tight communication with the tube receiving cavity of the penumatic tire exterior of the inner tube,
      (2) the other of the conduits being in fluid tight communication with the independent, self-contined cavity within the inner tube,
   (b) a pressure indicator on said valve stem exterior of said rim and adapted to be in fluid communication with said conduit which is in fluid tight communication with the tire cavity, exterior of the inner tube.

2. An air leak indicator for use with a pneumatic tire and rim assembly, which rim has a perforation formed therein, the tire of which assembly has a normally air tight tube receiving cavity formed therein, with an inner tube in the cavity of said pneumatic tire, which air leak indicator system comprises;

(a) a conduit adapted to extend through the perforation in said rim to conduct air under pressure from a point within said tire cavity between said tire and said inner tube to a point exterior of said rim,
      (1) a closure closing said conduit to prevent the escape of any air from said tire cavity through said conduit while indicating the presence of air pressure within said tire cavity exterior of the inner tube,
   (b) sealing means forming an air tight seal intermediate said tire cavity which receives said inner tube and the exterior of said rim, and
   (c) a pressure indicator on said conduit exterior of said rim and being connected in fluid communication with said conduit leading to said tire cavity exterior of said tube to indicate the presence of air within said tire cavity exterior of said inner tube.

3. An air leak indicator for use with a penumatic tire having a tube receiving cavity formed therein and an inner tube in said cavity in said pneumatic tire, with a tire being mounted on a rim, which rim has a perforation formed therein to receive a conduit therethrough, which air leak indicator consists of;
  (a) a conduit adapted to extend through the perforation in said rim to conduct air pressure from a point within said tire cavity between said tire and said inner tube to a point outwardly from said rim,
    (1) a closure closing said conduit to prevent the escape of any air from the tire cavity through the conduit while indicating the presence of air pressure within the tire cavity exterior of the inner tube,
  (b) sealing means forming an air tight seal intermediate the perforation in said rim and said cavity in said tire, to form a substantially air tight tube receiving cavity therein,
  (c) an indicator means connected in fluid communication with said conduit exterior of said tire cavity to indicate the presence of air pressure within said tire cavity exterior of said tube.

4. An air leak indicator for use with a pneumatic tire having a normally air tight tube receiving cavity formed therein, an inner tube in said cavity of said pneumatic tire, which air leak indicator system comprises;
  (a) an air conduit connected with said normally air tight tube receiving cavity in said pneumatic tire exterior of said inner tube and extending to a point outward therefrom,
    (1) a closure for closing said conduit to prevent the escape of any air from said tire cavity through said conduit while indicating the presence of air pressure within the tire cavity exterior of the inner tube,
  (b) pressure indicator means connected in fluid communication with said conduit and being fitted in air tight relation with said conduit exterior of said tire cavity to indicate the presence of air pressure within said tire cavity exterior of said tube.

5. An air leak indicator for use with a pneumatic tire having a normally air tight tube receiving cavity formed therein, an inner tube in said cavity of said pneumatic tire, which air leak indicator system comprises;
  (a) said tube receiving cavity having a valve stem in communication with said inner tube and extending outward therefrom,
    (1) a valve in said valve stem
  (b) an air conduit leading from said air tight tube receiving cavity exterior of said tube being connected in fluid communication with said valve stem outward from said valve in said valve stem,
  (c) closure means for closing said conduit and said valve stem to confine air pressure within said tube receiving cavity to prevent air under pressure passing outward through said conduit and said valve in said valve stem, and
  (d) pressure indicating means to indicate air pressure reacting on said closure means to indicate air pressure in said tire cavity exterior of said tube or air passing by said valve in said valve stem.

6. An air leak indicator for use with a pneumatic tire having a tube receiving cavity formed therein and an inner tube in said cavity in said pneumatic tire, said pneumatic tire being mounted on a rim, which rim has a perforation formed therein to receive a conduit therethrough, which air leak indicator comprises;
  (a) a conduit adapted to extend through the perforation in said rim to conduct air pressure from a point within said tire cavity between said tire and said inner tube to a point outward from said rim,
  (b) an enlarged base, having faces on opposite sides thereof, on the inner side of said conduit,
    (1) grooved passages extending along one of said faces of said base within said tire cavity exterior of said tube to direct air under pressure through said grooved passage to opening in said conduit,
  (c) at least one rubber-like washer surrounding said conduit and forming an air tight seal between said conduit and said rim,
  (d) said conduit being adapted to receive a valve stem therein so as to form a passage between said valve stem and the inner wall of said conduit,
  (e) means closing the outer end of said conduit, and
  (f) pressure indicating means within said closure means to indicate the pressure in said conduit.

7. An air leak indicator for use with a pneumatic tire having a tube receiving cavity formed therein and an inner tube in said cavity in said pneumatic tire, said pneumatic tire being mounted on a rim, which rim has a perforation formed therein to receive a conduit therethrough, which air leak indicator comprises the structure as defined in claim 5; and wherein
  (a) means securing said conduit in air tight relation in said rim independently of said valve stem.

8. An air leak indicator for use with a pneumatic tire having a tube receiving cavity formed therein and an inner tube in said cavity of said pneumatic tire, which pneumatic tire is mounted on a rim, which rim has a perforation formed therein to receive a conduit therethrough, which air leak indicator comprises;
  (a) a conduit adapted to extend through the perforation in said rim to conduct air pressure from a point within said tire cavity between said tire and said inner tube to a point outwardly from said rim,
  (b) sealing means forming an air tight seal intermediate the perforation in said rim and said conduit extending therethrough, and
  (c) an indicator means connected in fluid communication with said conduit exterior of said tire cavity to indicate the presence of air pressure within said tire cavity exterior of said tube.

9. An air leak indicator for use with a pneumatic tire having a tube receiving cavity formed therein and an inner tube in said cavity in said pneumatic tire, which pneumatic tire is mounted on a rim, which rim has a perforation formed therein to receive a conduit therethrough, which air leak indicator comprises;
  (a) a valve stem in fluid communication with the cavity in said inner tube,
  (b) a conduit in fluid communication with the tire cavity exterior of said inner tube,
  (c) said valve stem and said conduit extending outward through said perforation in said rim,
    (1) sealing means surrounding said valve stem and said conduit and forming an air tight seal between said perforation in said rim and said valve stem and said conduit,
  (d) indicator means connected in fluid communication with said conduit exterior of said tire cavity to indicate the presence of air pressure within said tire cavity exterior of said tube.

10. An air leak indicator for use with a pneumatic tire having a tube receiving cavity formed therein and an inner tube in said cavity in said pneumatic tire, which pneumatic tire is mounted on a rim, which rim has a perforation formed therein to receive a conduit therethrough, which air leak indicator comprises;
  (a) a valve stem,
    (1) said valve stem having a first passage formed therein which is in fluid communication with the cavity within said inner tube,
    (2) said valve stem having a second passage formed therein which is in communication with said cavity within said tire exterior of said tube,
  (b) sealing means forming an air tight seal between said rim and said valve stem,
  (c) said second passage in said valve stem forming a conduit from said sealed tire cavity exterior of said tube to the outer end of said valve stem to conduct air under pressure thereto,
  (1) a closure closing said second passage to prevent the escape of any air therefrom,
(d) indicator means connected in fluid tight relation with the outer end of said valve stem to indicate the presence of air pressure within said tire cavity exterior of said tube.

11. In a fluid pressure indicator for indicating pressure in a tire cavity within a pneumatic tire exterior of the inner tube of the tire;
(a) a pressure indicator body,
  (1) means attachably connecting said pressure indicator body to a conduit,
  (2) said pressure indicator body having an axial bore formed therein,
(b) a piston fitted in said bore in fluid tight sliding relation,
(c) a pin extending outward from said piston through the upper end of said body,
(d) an abutment formed at the distal end of said body, which abutment has an opening formed therethrough,
(e) a spring surrounding said pin and having one end thereof seated on said piston, the other end of said spring seating against said abutment,
(f) a second abutment means near the opposite end of said bore from said first abutment to retain said piston within said bore, and
  (1) said piston adapted to move within said bore against the tension of said spring to urge said pin outward through said opening in said first abutment upon increase of pressure within said conduit connected with said tire cavity exteriorly of the inner tube.

12. An air leak indicator for use in combination with a pneumatic tire having a tube receiving cavity formed therein, an inner tube within said cavity in said pneumatic tire, a rim fitted on said tire, which rim has a perforation formed therein, which air leak indicator comprises;
(a) a shell,
(b) means forming an air tight seal between said rim and said shell,
(c) conduit means to conduct air from a point within said tire cavity between said tire and said tube to said shell,
(d) a closure fitted on said shell in air tight relation,
(e) yieldable means within said closure responsive to pressure within said tire cavity between said inner tube and said tire, and
(f) visible means on said closure indicating existence of air pressure within said tire cavity between said tire and said inner tube.

13. An air leak indicator for use in combination with a pneumatic tire having a tube receiving cavity formed therein, an inner tube within said cavity in said pneumatic tire, a rim fitted within said tire, which rim has a perforation formed therein, which air leak indicator comprises;
(a) a shell,
(b) gasket means forming an air tight seal between said rim and said shell,
(c) a valve stem mounted in said inner tube and extending outward into said shell,
(d) said shell having an air passage therein exterior of said valve stem in said inner tube,
(e) a perforate washer surrounding said valve stem,
(f) said perforate washer having grooves formed therein and being in communication with said perforation therein,
(g) said perforation in said grooved washer being in fluid communication with said cavity in said tire between said tire and said inner tube,
(h) said perforation in said washer being in fluid communication with said air passage between said valve stem and said shell,
(i) a closure fitted on the distal end of said shell in air tight relation,
(j) yieldable means within said closure responsive to pressure within said tire cavity between said inner tube and said tire, and
(k) visible means on said closure indicating the presence of air pressure within said cavity between said tire and said inner tube.

14. A tire valve assembly and air leak indicator in combination with;
(a) a wheel rim,
  (1) said wheel rim having a perforation formed therein,
(b) a tire,
  (1) an inner tube receiving cavity in said tire,
(c) an inner tube mounted in said cavity of said tire,
  (1) said tire and said inner tube being mounted on said perforate wheel rim,
  (2) said tire valve assembly and air leak indicator comprising,
(d) a valve stem mounted in said inner tube and being in fluid communication only therewith,
  (1) said valve stem extending outward through said perforation in said wheel rim,
(e) a shell circumposed about said valve stem to form an air passage and having an open inner end thereof surrounding said perforation in said rim and being in fluid communication only with the cavity formed within said tire between said tire and said inner tube,
(f) means forming a seal between said shell and said rim to prevent the escape of air from said tire cavity to a point exterior of said tire when the tube within said tire is inflated,
(g) leak indicator means secured to the outer end of said shell in fluid tight relation, which leak indicator means is in fluid communication with said shell,
(h) pressure responsive, movable means mounted within said shell to actuate said leak indicator,
  (1) a portion of said pressure responsive means adapted to extend outwardly upon application of pressure within said shell so said pressure responsive means will provide a visual leak indicator, and
(i) means within said air leak indicator means to prevent the escape of air therethrough.

References Cited by the Examiner
UNITED STATES PATENTS

| | | | |
|---|---|---|---|
| 1,455,146 | 5/23 | Nelson | 116—34 X |
| 1,671,852 | 5/28 | Caldwell | 73—49 |
| 2,798,449 | 7/57 | Catlin | 116—34 |
| 2,915,035 | 12/59 | Russell | 116—34 |
| 2,948,256 | 8/60 | Tapp | 73—146.8 |

LOUIS J. CAPOZI, *Primary Examiner.*